Feb. 19, 1929.
A. H. SCHLOZ
1,702,548
CLUTCH MECHANISM
Filed Jan. 23, 1926    4 Sheets-Sheet 1
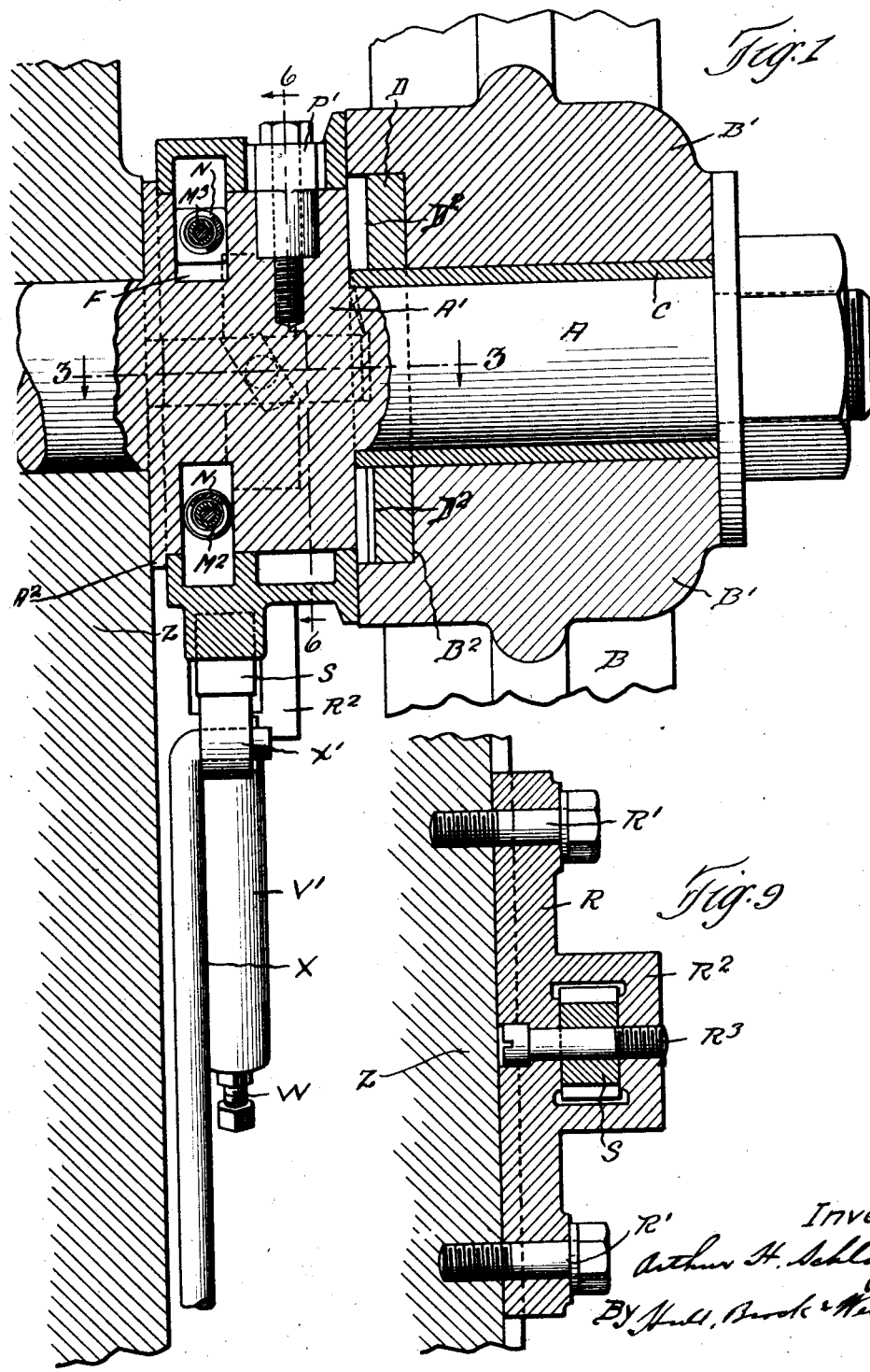

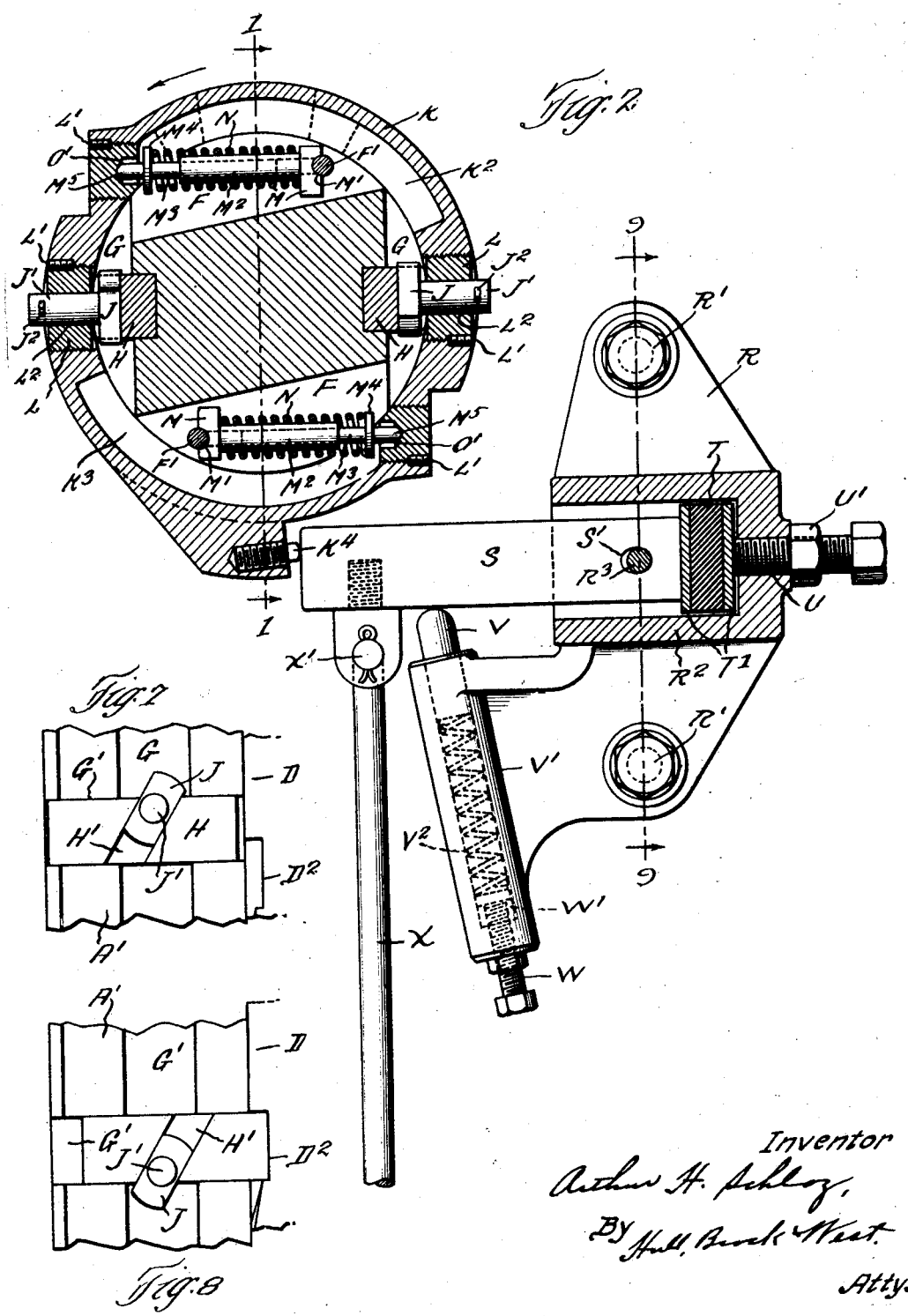

Feb. 19, 1929.                                                  1,702,548
                        A. H. SCHLOZ
                       CLUTCH MECHANISM
                    Filed Jan. 23, 1926          4 Sheets-Sheet 3
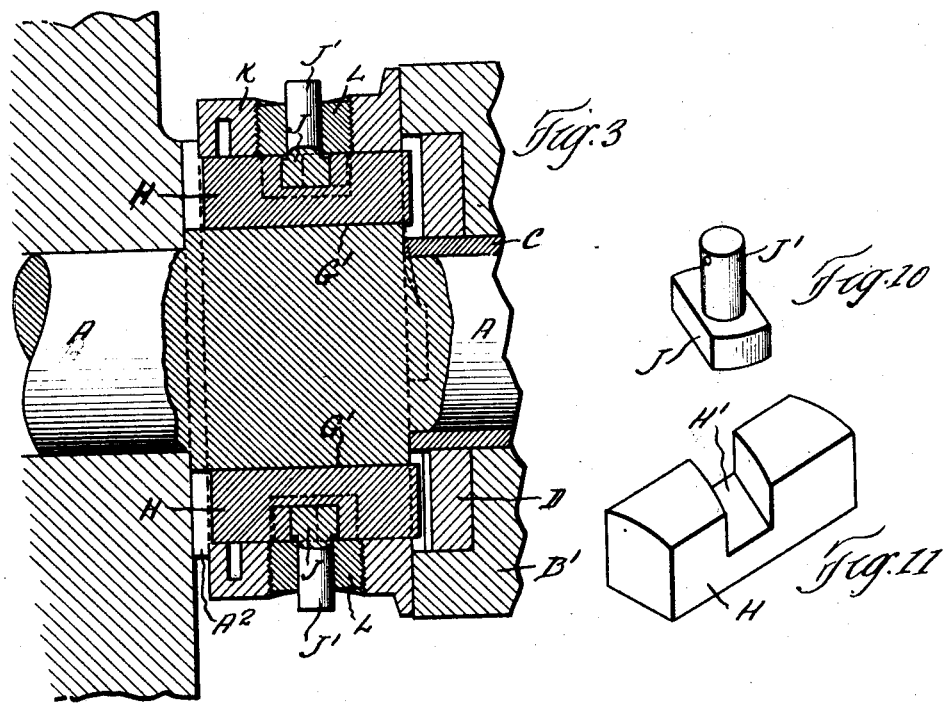
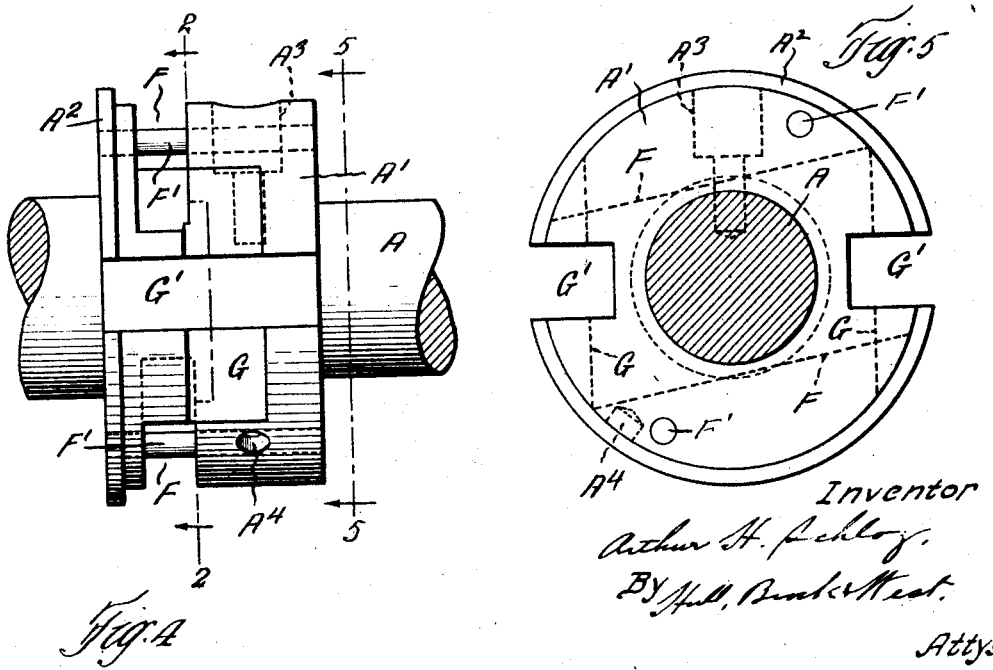

Feb. 19, 1929.
A. H. SCHLOZ
1,702,548
CLUTCH MECHANISM
Filed Jan. 23, 1926   4 Sheets-Sheet 4
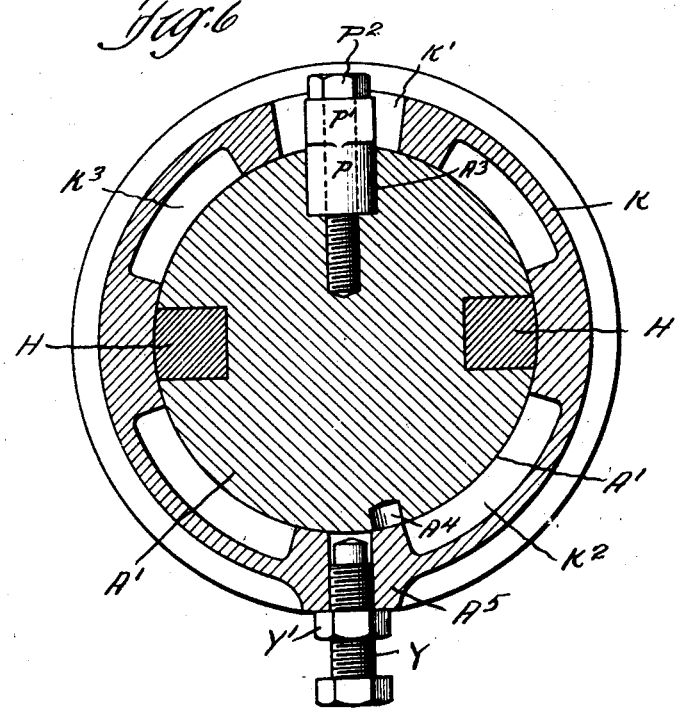
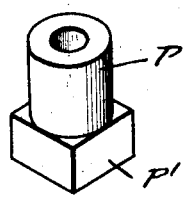
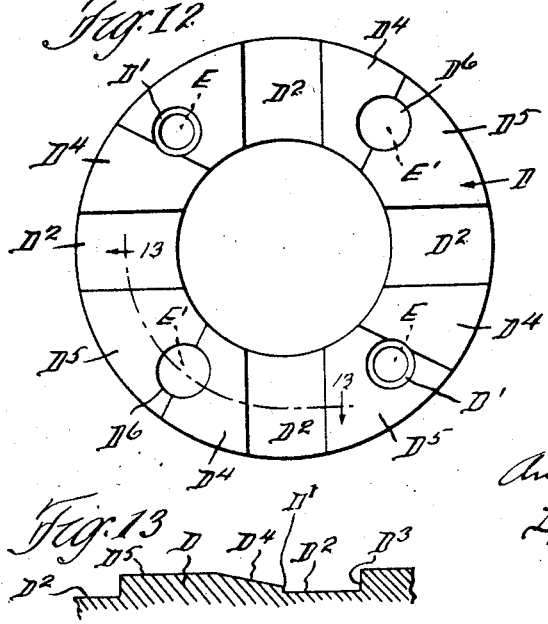
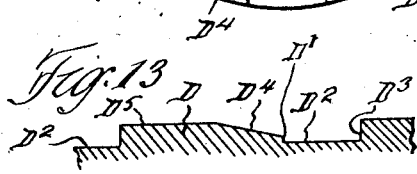

Patented Feb. 19, 1929.

1,702,548

UNITED STATES PATENT OFFICE.

ARTHUR H. SCHLOZ, OF TOLEDO, OHIO, ASSIGNOR TO THE CLEVELAND PUNCH & SHEAR WORKS COMPANY, OF CLEVELAND, OHIO, A CORPORATION OF OHIO.

CLUTCH MECHANISM.

Application filed January 23, 1926. Serial No. 83,211.

This invention relates to clutch mechanism and has for its general object to improve the efficiency of such mechanism. Further objects of the invention are to provide a clutch mechanism wherein the working parts are completely encased, and particularly wherein such working parts are completely encased by the collar by means of which the engaging and disengaging members are operated; also to provide clutch mechanism wherein the working parts may be lubricated, and particularly in connection with the said collar. A further object of the invention is to provide mechanism of the character described with engaging pins or dogs operated by the said collar and wherein the pins or dogs may be located as nearly as possible to the center of the shaft, whereby the shocks on said pins or dogs are reduced to a minimum. The invention also includes certain details of construction which will be pointed out in the specification and embodied in the claims hereto annexed.

Referring to the drawings, Fig. 1 represents a vertical sectional elevation through a shaft section and a hub having my clutch mechanism applied thereto, the collar-stop being shown mainly in elevation; Fig. 2 a transverse sectional view through the clutch mechanism, corresponding substantially to the line 2—2 of Fig. 4, the stop mechanism being shown in sectional elevation; Fig. 3 a sectional detail corresponding to the line 3—3 of Fig. 1; Fig. 4 a detail in side elevation of cooperating parts of the shaft section and hub and showing the construction of the enlarged part of the shaft; Fig. 5 a sectional elevation corresponding to the line 5—5 of Fig. 4; Fig. 6 a sectional view corresponding to the line 6—6 of Fig. 1, certain parts being shown in elevation; Figs. 7 and 8 are details in side elevation of the enlarged end of the shaft showing the driving dogs and keys in disengaging and engaging positions, respectively; Fig. 9 is a detail in section through the stop mechanism corresponding substantially to the line 9—9 of Fig. 2; Fig. 10 a detail in perspective of one of the driving dogs; Fig. 11 a detail in perspective of one of the driving keys; Fig. 12 an end elevation of the driving ring; Fig. 13 a sectional development of said ring corresponding substantially to the line 13—13 of Fig. 12; and Fig. 14 a detail in perspective of the removable collar stop carried by the shaft.

In the particular embodiment of my invention set forth herein, the driving member is a hub operated by means of a pulley, flywheel, or the like, and carries a ratchet ring the driving notches whereof are adapted to receive keys mounted in the adjacent enlarged portion of a driven shaft and slidable longitudinally with respect to said shaft, the said keys being operated by pins or dogs mounted in a collar surrounding such enlarged portion of the shaft. A stop is provided to limit the rotary movement of the collar with respect to such enlarged portion of the shaft, and external stop mechanism is also employed for the purpose of engaging the collar and causing the withdrawal of the driving keys or pawls.

Referring to the drawings, A denotes the driven member, which in this case is a shaft, and which shaft is to be driven by a driving member, the latter member being the hub B′ of a pulley or flywheel B, the hub surrounding a portion of the shaft A, there being a bushing C interposed between the said hub and the said shaft. Adjacent the hub B′, the shaft A is provided with an annular enlargement A′, the side of such enlargement opposite the hub B′ having an annular flange A² which is adapted to bear against a support Z into or through which the shaft A extends. In the face of the hub B′ which is presented toward the enlargement A′ is an annular recess B² surrounding the bushing C. In said recess is mounted a driving ring D which is fastened to the said hub by means of screws E, the ring D being provided with countersunk seats D′ for the heads of the screws (see Fig. 12). This ring is provided with driving notches D² which are adapted to receive driving keys in the shaft enlargement A′. By reference to Figs. 12 and 13, it will be seen that each driving notch D² has shoulders D³ and D⁷ at opposite ends thereof, the shoulder D⁷ forming a driving projection. An inclined face D⁴ extends outwardly from the shoulder D⁷ to a flat face D⁵ (substantially perpendicular to the axis of rotation of the ring) which extends from the surface D⁴ to the shoulder D³ of the adjacent notch. The ring is also provided with additional holes D⁶ for dowel pins E′.

Referring to Figs. 1, 2 and 4, and assuming, for convenience of description, that the parts are in the positions shown in such views, the shaft enlargement A' is provided adjacent the end opposite the hub B' with upper and lower inclined slots F, each slot extending radially inwardly from the outer cylindrical surface of such enlargement. In addition, the enlargement A' is provided with a pair of opposed slots G each extending radially inwardly from the outer cylindrical surface of the enlargement and being offset toward the hub-facing end of such enlargement with respect to the slots F. A bolt F' extends across each slot F, adjacent one end thereof, each bolt being anchored in the enlargement A'.

Projecting toward the axis of the shaft A from the bottom of each slot G is a keyway G'. Each keyway extends not only across and beyond the bottom of its cooperating slot G but also across the portions of the enlargement A' on each side of such slot—see Figs. 7 and 8.

Mounted in each keyway G' is a key H having intermediate the ends thereof a diagonal slot H' for the reception of a driving dog, having an elongated body J, adapted to form a sliding fit in such slot, and an operating pin J'.

Surrounding the shaft enlargement A' is the collar, indicated generally at K. This collar is adapted to bear at one side against the flange A² and at its opposite side against the adjacent face of the hub B' and, because it fits closely the general cylindrical outer surface of the enlargement A', is adapted to form a grease receptacle for the working parts of the clutch. This collar has plugs L threaded into oppositely located openings in diametrically opposite parts of its circumferential wall, the said plugs being anchored by means of lock pins L' and each being provided with a central bore L² adapted to receive a pin J', each pin having a cotter pin J² through its outer end. It will be evident that, by rotating the collar K in appropriate directions, the dogs J will be moved along the slots H' in the keys H, thereby to force the keys into and out of driving engagement with the notches D² in the driving ring D—see Figs. 7 and 8. The slots G accommodate these movements of the dogs. The dogs J, the pins J', the collar plugs L, and the inclined slots H' constitute interengaging cam means for operating the keys.

In all of the assembly views shown herein, the keys H are in a position intermediate of the two positions shown in Figs. 7 and 8.

The collar and the shaft are provided with cooperating mechanism for normally holding the keys H in driving engagement with the notches of the driving ring D. The said means are located in the slots F and comprise the bolts F', which have been referred to hereinbefore, with a block M in each slot having a rounded recess M' in its bottom by means of which each is mounted upon the appropriate bolt. Projecting from each block M is a sleeve M², each sleeve receiving therein a pin M³, there being a spring N surrounding the telescoping parts of each sleeve and pin, each spring bearing against a block M and a head M⁴ on the cooperating pin, whereby each spring tends to thrust each pin M³ away from the cooperating block M. The outer end M⁵ of each pin is seated in a recess O' in a plug which is threaded into the collar K, being locked in place by means of a lock pin L' similar to the first mentioned lock pins. When the collar K is free to be operated by the springs N, the said collar will be turned in the direction indicated by the arrow on Fig. 2, which will move the dogs J a sufficient distance to throw the keys H into driving engagement with the ring D.

In order to permit the collar to be driven by the shaft and at the same time limit the rotary movement of the collar in both directions with respect to the shaft enlargement A', the collar is provided with an arcuate slot K' which receives the head P' of a sleeve P, the sleeve fitting into a radial seat A³ in the enlargement A' and being secured in place by means of a bolt P² threaded through the said sleeve. A driving-pin connection is thus provided between the shaft enlargement A' and the collar K, the clearance between the head P' and the ends of the slot K' being sufficient to accommodate the movements of the keys H by the said collar into and out of driving engagement with the notches of the disk D.

It will be noted, by reference to Figs. 2 and 6, that the collar is provided with radial chambers K², K³ which are adapted to receive grease and to hold the same about the moving parts and particularly about the keys H and the keyways G'.

For the purpose of disengaging the keys H from the driving disk D, I have shown a stop mechanism which is illustrated in Figs. 1, 2 and 9. This mechanism comprises a bracket plate R which is shown as fastened to the wall Z at one side of the collar K, as by means of bolts R'. This bracket plate is provided with a housing R² in which is mounted the transverse pivot pin R³. S denotes an arm having a slot S' by means of which it is slidingly pivoted upon the pin R³. The inner end of the arm S bears against a buffer T of rubber or similar resilient material interposed between plates T' and adjustable toward the adjacent end of the arm S and adapted to be placed under compression against the adjacent end of the arm S by means of the bolt U threaded through the housing and provided with a lock nut U'. The opposite end of the arm S is normally held in position to engage a striking pin K⁴ on the ring K by means of a plunger V mounted in a cylinder V′ carried by the bracket plate R, the said plunger being held in yielding engagement with the arm S by means of a spring V² in said cylinder, the compressive action of the spring being varied by means of a bolt W threaded through the bottom of the cylinder and forcing a plunger or abutment W′ against the bottom of the spring.

A rod X is pivotally connected to the outer end of the arm S, as indicated at X′, the lower end of the rod being connected with any suitable operating means, as a treadle, whereby, when it is desired to drive the shaft A, the arm S will be withdrawn from the stop K⁴, whereupon the springs N will rotate the ring K a sufficient distance to move the keys H into driving engagement with the notches in the disk D. When the rotation of the ring is stopped by allowing the spring V² to move the arm S into position to engage the stop K⁴, the keys will be forced out of driving engagement with the notches D², the inclines D⁴ facilitating this action.

In Fig. 6 I have shown means, additional to the parts R—X′ for holding the collar K and the parts operated thereby out of driving or engaging relation with respect to the driving ring D. In this view, the parts are assumed to be in the intermediate position referred to hereinbefore, with the keys H and dogs J in a position intermediate between the positions shown in Figs. 7 and 8. To provide for holding the collar and the parts operated thereby in such inoperative position, the shaft enlargement A′ is provided with a short radial recess A⁴ extending inwardly from the circumferential portion thereof, and the collar is provided with a bolt Y threaded into a boss A⁵ and provided with a lock nut Y′. By moving the collar to bring the inner end of the bolt into register with the recess A⁴ and screwing the bolt inwardly, the collar may be secured in "out" position upon the shaft.

The construction and arrangement of parts set forth herein are particularly well adapted for the driving, by means of a pulley or flywheel of which B′ is the hub, of a crank shaft for operating a plurality of punch presses. However, it will be understood that I do not propose to limit myself to the use of my clutch mechanism with such specific driving and driven members. Furthermore, by employing stop mechanism such as shown at R—X′ inclusive with the pulley or flywheel B, the same clutch mechanism may obviously be used in cases where the shaft A is the driving member and the parts B, B′ constitute the driven member.

It will be noted that, because of the construction and arrangement of parts, the driving keys can be instantaneously engaged with the projections or shoulders of the driving ring, as soon as the rod or link X is depressed; also that the driving keys are interchangeable and reversible; also that, by reason of the inclines D⁴, the keys will be immediately and automatically disengaged from the ratchet ring D as soon as the stop pin K⁴ engages the lever arm S. Furthermore, by the construction and arrangement of parts, the pins J′ are operated from the collar by means of removable plugs, thereby facilitating the assembling and disassembling of parts; while the outer ends of the telescoping pins M³ are mounted in like manner in removable plugs carried by the collar, whereby like convenient access is had to the slots F and the parts therewithin. Furthermore, by reason of the particular manner of constructing and mounting the collar K, heavy lubricant, such as grease, may be retained about the operating parts with no material leakage.

Having thus described my invention, what I claim is:—

1. The combination, with a driving member and a driven member, one of such members having an annular enlargement and the other member having driving projections facing such enlargement and the said enlargement being provided with keyway slots formed therein extending inwardly from the outer surface thereof, of keys in said slots adapted to engage and disengage said projections, each key being provided with an inclined slot, a dog mounted in each such slot, a pin projecting from each such dog, a collar surrounding the said enlargement, and plugs removably mounted in the said collar and each adapted to receive a pin whereby the rotation of the said collar in opposite directions will move the keys into and out of driving engagement with the said projections.

2. The combination, with a driving member and a driven member, one of such members having an annular enlargement and the other member having driving projections facing such enlargement and the said enlargement being provided with keyway slots formed therein extending radially inwardly from the outer surface thereof in the direction of the axis of rotation of said enlargement, of keys in said slots adapted to engage and disengage said projections, each key being provided with an inclined slot, a dog mounted in each such slot, the said enlargement having inwardly extending slots intersecting the keyway slots and providing spaces within which the ends of the dogs may operate, a pin projecting from each such dog, a collar surrounding the said enlargement, and plugs removably mounted in the said collar and each adapted to receive a pin whereby the rotation of said collar in opposite directions will move the keys into and out of driving engagement with the said projections.

3. The combination, with a driving member and a driven member, one of such members having an annular enlargement and the other member having driving projections facing such enlargement and the said enlargement being provided with keyway slots formed therein extending inwardly from the outer surface thereof in the direction of the axis of rotation of said enlargement, of keys in said slots adapted to engage and disengage said projections, each key being provided with an inclined slot, a dog mounted in each such slot, a pin projecting from each such dog, a collar surrounding the said enlargement and plugs removably mounted in the said collar and each adapted to receive a pin whereby the rotation of the said collar in opposite directions will move the keys into and out of driving engagement with the said projections.

4. The combination, with a hub having a central bore and a recess in one face thereof surrounding said bore, a driving ring carried by said hub and located within said bore and having driving projections, and a shaft mounted in said bore and extending therebeyond, the shaft having an annular enlargement provided with inwardly extending slots and with a flange on the end thereof which is remote from said hub, of keys mounted in said slots and adapted to be moved into and out of engagement with said projections, a collar mounted on said enlargement between said flange and the face of the hub which surrounds the recess therein, the said collar forming a receptacle for lubricant, and means carried by the collar and engaging the keys for moving the same into and out of engagement with the said projections by reverse rotary movements of the said collar.

5. The combination with a driving and a driven member, one of said members having an annular enlargement and the other member having driving projections presented toward said enlargement, said enlargement having inwardly extending slots, of keys mounted in said slots and adapted to be moved into and out of engagement with said projections, the enlargement also having a pair of inwardly extending slots extending transversely thereof and intersecting the first mentioned slots, operating means for said keys projecting into the second mentioned slots, the said enlargement having an additional pair of inwardly extending slots arranged transversely thereof, a collar surrounding said enlargement, driving connections between said collar and the key-operating means, and means in the third pair of slots for imparting limited rotary movement to said collar, the said means comprising an anchor member carried by said enlargement in each slot, a block bearing against each anchor member and provided with a telescoping member projecting therefrom, a member telescopically mounted with respect to each of the first mentioned telescoping members, plugs in said collar engaging each second telescoping member, and a spring surrounding each pair of telescoping members and tending to force them apart thereby to impart such limited rotary movement to said collar.

6. The combination with a driving and a driven member, one of said members having an annular enlargement and the other member having a driving projection presented toward said enlargement, said enlargement having an inwardly extending slot, a key mounted in said slot and adapted to be moved into and out of engagement with said projection, the said enlargement having a radially inwardly extending slot arranged transversely thereof, a collar surrounding said enlargement, driving connections between said collar and the key-operating means, and means in the second slot for imparting limited rotary movement to said collar, the said means comprising an anchor member carried by said enlargement in said slot, a block bearing against said anchor member and provided with a telescoping member projecting therefrom, a member telescopically mounted with respect to the first mentioned telescoping member, a plug in said collar engaging the second telescoping member, and a spring surrounding the telescoping members and tending to force them apart thereby to impart such limited rotary movement to said collar.

7. The combination with a machine frame, a shaft mounted therein, and a wheel hub on the shaft, the shaft having an annular enlargement between the hub and frame, of a clutch mechanism carried by said enlargement, and a collar surrounding said enlargement, between the hub and frame, and provided with grease-retaining recesses.

In testimony whereof, I hereunto affix my signature.

ARTHUR H. SCHLOZ.